(12) United States Patent
Bloching et al.

(10) Patent No.: US 11,247,679 B2
(45) Date of Patent: Feb. 15, 2022

(54) METHOD FOR DETERMINING THE MASS OF A MOTOR VEHICLE

(71) Applicant: ZF Friedrichshafen AG, Friedrichshafen (DE)

(72) Inventors: Axel Bloching, Ravensburg (DE); Horst Leichsenring, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 216 days.

(21) Appl. No.: 16/468,458

(22) PCT Filed: Nov. 17, 2017

(86) PCT No.: PCT/EP2017/079550
§ 371 (c)(1),
(2) Date: Jun. 11, 2019

(87) PCT Pub. No.: WO2018/114158
PCT Pub. Date: Jun. 28, 2018

(65) Prior Publication Data
US 2020/0189594 A1 Jun. 18, 2020

(30) Foreign Application Priority Data

Dec. 20, 2016 (DE) .................... 10 2016 225 536.3

(51) Int. Cl.
*B60W 30/18* (2012.01)
*B60W 40/13* (2012.01)
*F16H 63/48* (2006.01)

(52) U.S. Cl.
CPC ...... *B60W 30/18027* (2013.01); *B60W 40/13* (2013.01); *F16H 63/48* (2013.01);
(Continued)

(58) Field of Classification Search
CPC .................................................. F16H 63/48
See application file for complete search history.

(56) References Cited

U.S. PATENT DOCUMENTS 7,363,116 B2 * 4/2008 Flechtner .............. B60W 40/13
303/121
8,188,385 B2 5/2012 Wolfgang et al.
(Continued)

FOREIGN PATENT DOCUMENTS

DE 10 2007 015 356 A1 10/2008
DE 10 2009 030 084 A1 12/2010
(Continued)

OTHER PUBLICATIONS

German Search Report Corresponding to 10 2016 225 536.3 dated Aug. 31, 2017.
(Continued)

*Primary Examiner* — Jeff A Burke
*Assistant Examiner* — Jerrod Irvin Davis
(74) *Attorney, Agent, or Firm* — Finch & Maloney, PLLC; Michael Bujold; Jay Franklin

(57) ABSTRACT

A method for the provisional determination of the mass of a motor vehicle, for controlling a starting operation when the motor vehicle is at rest. The method determines the mass of the motor vehicle as a function of inclination information about the motor vehicle or the road on which the motor vehicle is located, and as a function of a force required for releasing an engaged parking lock while the motor vehicle is at rest.

9 Claims, 2 Drawing Sheets

(52) U.S. Cl.
    CPC ... *B60W 2520/105* (2013.01); *B60W 2530/10* (2013.01); *B60W 2552/15* (2020.02)

(56) References Cited

U.S. PATENT DOCUMENTS

| | | | | |
|---|---|---|---|---|
| 2005/0065695 | A1* | 3/2005 | Grieser | G01G 19/086 |
| | | | | 701/70 |
| 2010/0262329 | A1* | 10/2010 | Monti | B60T 7/122 |
| | | | | 701/31.4 |
| 2011/0202249 | A1* | 8/2011 | Pothin | B60T 7/122 |
| | | | | 701/70 |
| 2013/0192937 | A1* | 8/2013 | Furuyama | B60T 13/66 |
| | | | | 188/72.6 |
| 2014/0172253 | A1* | 6/2014 | Palmer | F16H 61/0213 |
| | | | | 701/56 |
| 2015/0232097 | A1* | 8/2015 | Luther | B61L 3/006 |
| | | | | 701/123 |
| 2016/0023660 | A1* | 1/2016 | Yu | B60W 10/188 |
| | | | | 477/188 |
| 2018/0065629 | A1* | 3/2018 | Wolff | B60L 7/12 |
| 2018/0304884 | A1* | 10/2018 | Jundt | B60W 30/09 |

FOREIGN PATENT DOCUMENTS

| | | |
|---|---|---|
| DE | 10 2012 004 370 A1 | 9/2012 |
| DE | 10 2014 223 037 A1 | 5/2016 |
| JP | 2002-340165 A | 11/2002 |
| JP | 2012-202835 A | 10/2012 |

OTHER PUBLICATIONS

International Search Report Corresponding to PCT/EP2017/079550 dated Mar. 21, 2018.
Written Opinion Corresponding to PCT/EP2017/079550 dated Mar. 21, 2018.

* cited by examiner

METHOD FOR DETERMINING THE MASS OF A MOTOR VEHICLE

This application is a National Stage completion of PCT/EP2017/079550 filed Nov. 17, 2017, which claims priority from German patent application serial no. 10 2016 225 536.3 filed Dec. 20, 2016.

FIELD OF THE INVENTION

The present invention relates to a method for the provisional determination of the mass of a motor vehicle, for controlling a starting operation from when the motor vehicle is at rest. Furthermore, the invention relates to a control unit designed to carry out the method, and to a corresponding computer program product.

BACKGROUND OF THE INVENTION

For the optimum control of a starting operation of a motor vehicle from rest, it is necessary to know the mass of the motor vehicle. This is particularly important in the case of motor vehicles whose vehicle mass varies markedly, for example utility vehicles such as trucks. Only when the vehicle mass of the motor vehicle is known can a starting operation be chosen correctly.

Since motor vehicles such as utility vehicles do not as a rule have any sensor with the help of which the mass of the vehicle can be detected by measurement-technological means, it is necessary to determine the vehicle's mass by computation. Thus, from DE 10 2007 015 356 A1 a method is known with the help of which, while driving, a dynamic vehicle mass value is determined and when the control unit is de-initialized that value is stored in a data memory. Since while a motor vehicle such as a truck is at rest its mass can change substantially due to loading and/or unloading, in DE 10 2007 015 356 A1 it is provided that when the control unit is initialized an axle load of a rear axle of the motor vehicle is determined and from that a stationary vehicle mass value is determined. If the mass values determined differ from one another by more than a specified tolerance range, the statically determined vehicle mass value is used as the relevant vehicle mass value for controlling the starting operation.

SUMMARY OF THE INVENTION

Against that background the purpose of the present invention is to propose a new type of method for the provisional determination of the mass of a motor vehicle. In addition, a corresponding control unit and a computer program product for carrying out the method are to be indicated.

From the process-technological standpoint this objective is achieved, starting from the features of the independent claim(s). Moreover, a control unit and a computer program product are the object of the other independent claims. Advantageous further developments are the object of the subordinate claims and of the description that follows.

According to the invention, a method for the provisional determination of the mass of a motor vehicle, in particular a utility vehicle, is proposed for controlling a starting operation of the motor vehicle from rest.

To achieve the stated aim it is provided that the mass of the motor vehicle is determined in accordance with information about the inclination of the motor vehicle or the road on which the motor vehicle is located, and also in accordance with the force required in order to disengage a parking lock which is engaged while the motor vehicle is at rest.

The invention is based on the recognition that in the engaged condition of the parking lock—i.e. when a locking pawl of the parking lock is engaged with interlock in a tooth gap of the parking lock wheel—a locking element of the parking lock is clamped between the pawl and a guide-plate of the parking lock in order to prevent the pawl from being pushed out of a tooth gap of the parking lock wheel, whereby a torque applied from the drive wheels of the motor vehicle to the transmission on the drive output side is supported against the pawl.

When the vehicle is stopped on an incline, i.e. an uphill or a downhill slope, the parking lock wheel is acted upon by a torque produced by a downhill-slope force acting on the vehicle, which on the drive output side passes into the drive-train. By blocking the transmission output shaft by means of the parking lock, the drive-train between the drive wheels and the parking lock is braced, and the bracing of the drive-train increases as the inclination of the road increases.

The level of the bracing itself depends on the braking torque on the vehicle wheels, which in turn depends on the downhill-slope force. The downhill-slope force itself depends on the inclination of the road and the weight of the vehicle.

Owing to the bracing in the drive-train there is a torsional moment in the parking lock wheel, which by way of the teeth between the parking lock wheel and the pawl, produces a force that presses the pawl against the locking element. The larger the torsional moment, the larger is the force acting on the locking element and consequently the larger is also the force required for releasing the parking lock.

The force required for releasing the engaged parking lock when the motor vehicle is at rest is thus related to the downhill-slope force acting on the motor vehicle. Consequently, the downhill-slope force can be deduced from the force required for releasing the parking lock.

Finally, for the provisional determination of the vehicle's mass it is also necessary to have information about the inclination of the motor vehicle or the road on which the motor vehicle is located. This information can for example be obtained from a sensor device such as an inclination sensor on the vehicle or an acceleration sensor on the vehicle. Alternatively or in addition, the inclination information can be obtained from a navigation device whereby position data of the motor vehicle are determined and can be compared with map data such as terrain or topography data stored in the navigation device, in order to determine the current inclination of the motor vehicle.

Since the force required to release the parking lock, which is related to the downhill-slope force, and the inclination of the motor vehicle or the road at the current location of the motor vehicle, are now known, the vehicle's mass can consequently be determined.

The engagement and release of the parking lock usually take place following a corresponding indication of the driver's wish, for example when for that purpose the driver moves a selector lever to a corresponding selector lever position. The release of the parking lock can be detected for example by means of a parking lock sensor.

Thanks to the method according to the invention for the provisional determination of the mass of the vehicle, it can reliably be determined whether the vehicle mass of the motor vehicle, in particular a truck, has changed while the vehicle is at rest, for example due to loading or unloading. Ultimately, the provisional vehicle mass so determined enables the starting operation after the parking lock has been released to be controlled more precisely, since for example a starting gear can be selected more appropriately. By virtue of a more appropriate determination of a starting gear gearshifts during starting are avoided, which on the one hand reduces wear and on the other hand increases the driving comfort. Since a vehicle mass value determined while driving is more accurate than the vehicle mass value determined by the method according to the invention determined in a stationary condition, it can advantageously be provided that the statically determined vehicle mass value is adapted or overwritten after a starting operation has been carried out, by a dynamic vehicle mass value determined while driving.

Since the mass of the motor vehicle is determined as a function of the force required to release the parking lock of the motor vehicle, it can be provided that the vehicle's mass is determined each time the parking lock is released so that with each starting operation the appropriate starting gear can be determined or the appropriate shifting characteristics or characteristic curve can be determined. Alternatively it can be provided that the vehicle's mass is determined after each fresh start of the motor vehicle or when the control unit, such as a transmission control unit, is initialized. The duration of a phase in which the motor vehicle is at rest can also be taken into account and the vehicle's mass is then only determined when the stationary phase lasts longer than a specifiable time. In that way it can be taken into account that a certain time is needed for a motor vehicle to be loaded or unloaded, so that if the specifiable time has not been exceeded it is assumed that no loading or unloading has taken place, and the vehicle's mass does not therefore have to be determined again.

A parking lock actuator for actuating the parking lock can for example be in the form of a piston-cylinder unit, which is acted upon by a pressure medium for the release of the parking lock. In such a case the piston-cylinder unit can be a hydraulic or pneumatic piston-cylinder unit and is accordingly acted upon by a hydraulic or pneumatic pressure medium, so that to release the parking lock a piston arranged to move in a cylinder fixed to the housing is acted upon by pressure. Depending on the pneumatic or hydraulic pressure required for releasing the parking lock, in a known way the force required to release the parking lock can be determined having regard to the piston area acted upon by the pressure.

For example the piston-cylinder unit can be acted upon by a specified set-point pressure, which is increased in steps or in a ramp-like manner. If the specified set-point pressure is increased in steps, it is advantageous to choose small set-point pressure intervals since in that way the pressure required for releasing the parking lock and hence the force required for the same can be determined more accurately. Consequently, so also can the mass of the vehicle. For a still more precise determination of the pressure required for releasing the parking lock, it can be provided that the piston-cylinder unit is acted upon by a set-point pressure whose specification is increased in a ramp-like manner. In that way the force needed for releasing the parking lock and hence also the vehicle's mass can be determined even more accurately. This enables the starting operation to be controlled still more precisely, since an even more exact initialization of the mass of the motor vehicle is possible thanks to a more exact estimation of the vehicle's mass.

In an alternative embodiment the parking lock actuator can be in the form of an electric actuator. The force applied by means of an electric actuator to the parking lock mechanism is proportional to the size of the electric current and can be regulated with great precision. Thus, having regard to the current with which the electric actuator is energized, the force required for releasing the parking lock can be deduced very accurately so that, likewise, an accurate estimate of the vehicle's mass is possible.

The invention also relates to a control unit designed to carry out the method according to the invention. The control unit comprises means that serve to carry out the method according to the invention. These means include hardware means and software means. The hardware means consist of data interfaces for the exchange of data with the assemblies of the drive-train involved in carrying out the method according to the invention. For this purpose the control unit is connected to the necessary sensors and if necessary also to other control units such as a navigation device, in order to receive the decision-relevant data and transmit control commands. For example an inclination sensor or an acceleration sensor for detecting a current inclination of the road on which the motor vehicle is located, can be integrated in the control unit. For example, the control unit can be in the form of a transmission control unit. The hardware means of the control unit also include a processor for data processing and if necessary a memory for data storage. The software means consist of program modules for carrying out the method according to the invention.

The solution according to the invention can also be incorporated as a computer program product which, when it runs in a processor of a control unit, instructs the processor by software means to carry out the associated process steps that are the object of the invention. In this connection a computer-readable medium is also an object of the invention, on which medium the above-mentioned computer program product is retrievably stored.

The invention is not limited to the indicated combination of characteristics described in the independent claims or the claims that depend on them. It is also possible to combine individual features with one another provided that they emerge from the claims, the description given below or directly from the drawings. References in the claims to the drawings by the use of indexes are not intended to restrict the protective scope of the claims.

BRIEF DESCRIPTION OF THE DRAWINGS

Below, the invention is explained in greater detail with reference to the attached figures, which show.

DETAILED DESCRIPTION OF THE PREFERRED EMBODIMENTS

Figure 1:
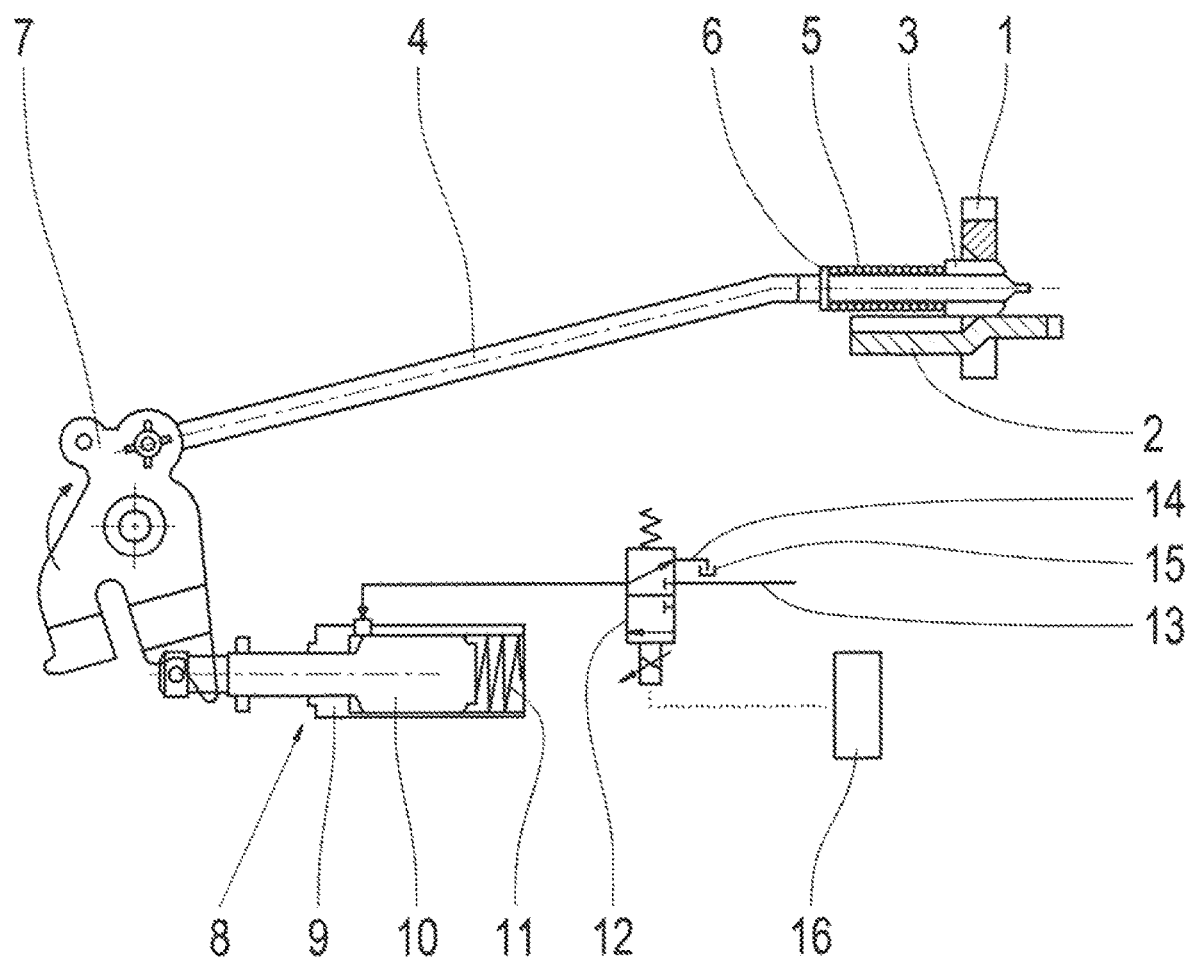
FIG. 1: A schematic representation of a parking lock of a motor vehicle.

The parking lock fora motor vehicle shown in FIG. 1 comprises a locking pawl 1 which engages in or disengages from a parking lock wheel (not shown here in greater detail) connected to a drive output (not shown) of a transmission, and an axially movable locking element 3 arranged on a connecting rod 4 that extends to an actuating plate 7 for example in the form of a parking plate, which element is in this example in the form of a locking cone. However, the locking element 3 could also be realized by means of appropriate roller elements. In the blocked condition of the parking lock—i.e. when the pawl 1 is engaged with interlock in a tooth gap of the parking lock wheel—the locking element 3 is clamped between the pawl 1 and a guide-plate 2 connected to a housing of the transmission (not shown here), in order to prevent the pawl 1 from being pushed out of the tooth gap of the parking lock wheel. In this case the locking element 3 is spring-loaded on the connecting rod 4 by means of a spring element 5, here for example in the form of a spiral spring, and is prestressed in the axial direction. For that purpose a stop 6 is arranged on the connecting rod 4, against which the spiral spring 5 is supported axially so that it prestresses the locking element 3 in the axial direction against the pawl 1 and the guide-plate 2. When the parking lock is engaged, the pawl 1 is pushed by the locking element 3 toward the parking lock wheel. If during this the pawl 1 encounters a tooth gap, then it engages therein and locks the drive output. In contrast if the pawl 1 encounters a tooth of the parking lock wheel, then it is prestressed by the spring element 5 so that when the drive output rotates, with the help of the prestressing force the pawl 1 engages in the next tooth gap of the parking lock wheel.

The parking plate 7 is connected to a parking lock actuator 8, which according to FIG. 1 is in the form of a piston-cylinder unit. To disengage the parking lock the parking lock actuator 8 is acted upon by pressure. In this case the piston-cylinder unit can be in the form of a hydraulic or a pneumatic piston-cylinder unit and is accordingly acted upon by a hydraulic or pneumatic pressure medium.

For this, under the control of a solenoid valve 12 pressure is delivered from a pressure medium supply line 13 to a cylinder 9 of the parking lock actuator 8, whereby a piston 10 of the parking lock actuator 8 is displaced axially in the cylinder 9 and the locking element 3 between the pawl 1 and the guide-plate 2 is pulled out by virtue of the parking plate 7 and the connecting rod 4 connected to the piston rod of the parking lock actuator 8.

To engage the parking lock, by means of the solenoid valve 12 the pressure supplied to the cylinder 9 is cut off and the cylinder space is vented by way of an outflow line 14 leading to a pressure medium sink 15. The parking lock actuator 8 or the piston 10 of the parking lock actuator is prestressed by means of a spring element to a locking position, whereby when a pressure drop takes place the parking lock changes to its engaged position and thereby a transmission output shaft is blocked. The spring element for prestressing the parking lock can for example be in the form of a compression spring 11 arranged inside the cylinder 9 of the parking lock actuator 8, which exerts a corresponding force on the piston 10 of the parking lock actuator 8. Alternatively or in addition to the spring element 11 shown in FIG. 1, the parking lock can also be prestressed by a prestressed leg-spring (not shown here) on the parking plate 7, by means of which the piston 10 of the parking lock actuator 8 is displaced in the "Parking" direction so that the parking lock is engaged. Such leg-springs for prestressing a parking lock have long been known.

The solenoid valve 12 is connected to a control unit 16 and is controlled in accordance with a selector lever position P, R, N, D. If the selector lever is in selector lever positions R, N or D the solenoid valve 12 is energized and the parking lock actuator 8 is pressurized, so that the parking lock is disengaged. In position P of the selector lever, in contrast, the solenoid valve 12 is not energized and the parking lock is engaged by means of the locking element 3.

In the engaged condition of the parking lock—i.e. when the locking pawl 1 is engaged with interlock in a tooth gap of the parking lock wheel—the locking element 3 of the parking lock is clamped between the pawl 1 and the guide-plate 2 of the parking lock, so that a torque applied from the drive wheels to the drive output side of the transmission is supported by the pawl 1 and the drive-train is thereby braced.

A torsional moment in the parking lock wheel produces, by virtue of the teeth between the parking lock wheel and the pawl 1, a force which presses the pawl 1 against the locking element 3. The larger the torsional moment, the larger is the force acting upon the locking element 3 and consequently the larger is also the force required for releasing the parking lock or the pressure required in the parking lock actuator 8 for releasing the parking lock.

Since the force required for releasing the parking lock engaged when the motor vehicle is at rest is related to the downhill-slope force acting on the motor vehicle, it follows that from the force required for releasing the parking lock the downhill-slope force can be deduced.

The current inclination of the motor vehicle or of the road on which the motor vehicle is located is determined by means of a device for determining the inclination, which can be in the form of an inclination sensor, an acceleration sensor or a navigation device.

Thus, the mass of the vehicle can be determined from the force required for releasing the parking lock, which is related to the downhill-slope force, and from the inclination information about the motor vehicle or the road on which the motor vehicle is located.

Figure 2:
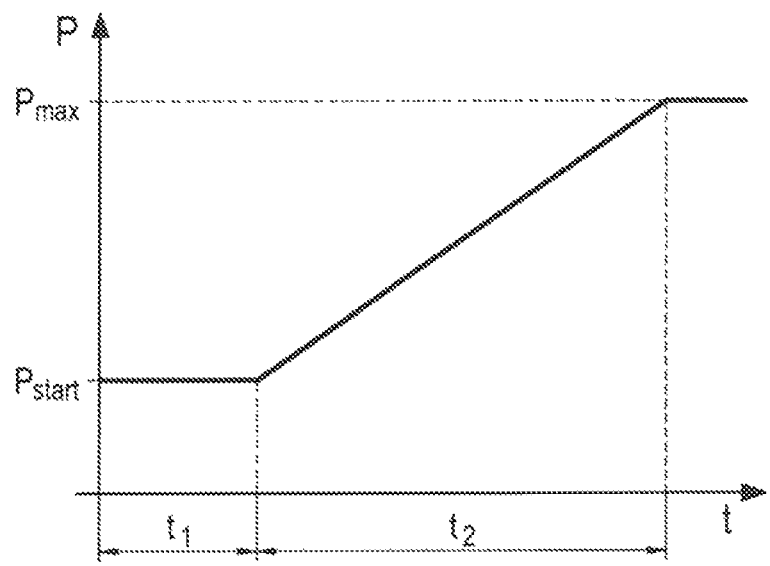
FIG. 2: A first pressure variation for controlling a parking lock actuator.

FIG. 2 shows a first variation of a specified set-point pressure for controlling the parking lock actuator 8 in the form of a piston-cylinder unit, when the parking lock is to be released. If the selector lever is moved away from the P selector lever position to some other selector lever position R, N or D, then the solenoid valve 12 is energized by the control unit 16 and a pressure is delivered to the parking lock actuator 8 in accordance with the set-point pressure specification.

First, the piston 10 of the parking lock actuator 8 is acted upon for a first specifiable time period $t_1$ with a first pressure value $p_{start}$, which is needed in order to be sure that the parking lock is disengaged when the motor vehicle is on level ground and is unloaded. This pressure value is substantially lower than a maximum pressure value $p_{max}$, and can for example be within a range between 3 and 5 bar. The time period $t_1$ can for example be chosen such that the pressure in accordance with the set-point pressure specification can build up in the cylinder 9 of the parking lock actuator 8. If the pressure bunt up in the cylinder 9 of the parking lock actuator 8 and acting upon the piston 10 is not sufficient to pull the locking element 3 out from between the pawl 1 and the guide-plate 2, then in accordance with the set-point pressure specification the pressure in the cylinder 9 is increased in a ramp-like manner for a second time period $t_2$. The pressure ramp can for example be implemented by way of a gradient specification or a target-value specification.

The increase of the specified set-point pressure now takes place until the parking lock is released or a maximum pressure value $p_{max}$ has been reached. The release of the parking lock can be detected by means of a parking lock sensor. The maximum pressure value $p_{max}$ is preferably chosen such that it is sufficient to release the parking lock when the motor vehicle is fully loaded and is located on an incline steeper than 15%. For example, the maximum pressure value $p_{max}$ can be within a range of 15 to 18 bar.

By virtue of the ramp-like set-point pressure specification the pressure required for releasing the parking lock and hence the force required for releasing the parking lock can be determined very accurately. Consequently the mass of the motor vehicle can also be determined relatively accurately, so that the appropriate starting gear or the appropriate shifting characteristic for a starting operation can be chosen.

Figure 3:
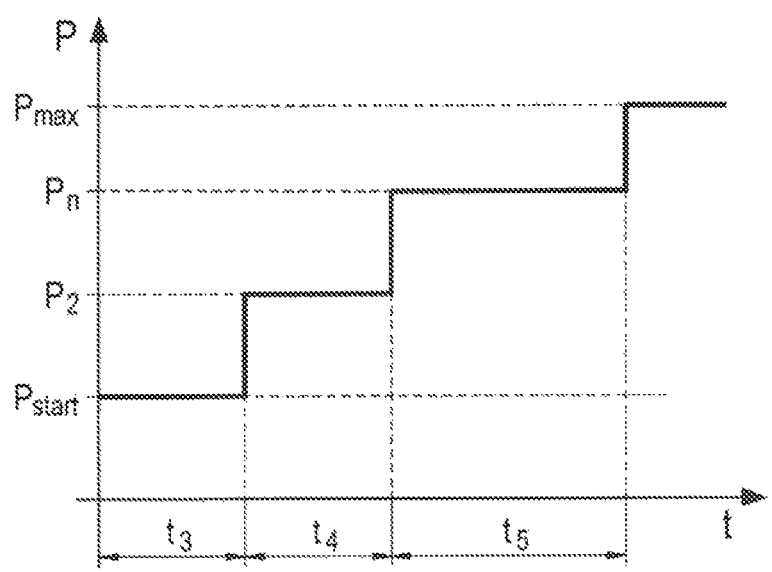
FIG. 3: A second pressure variation for controlling a parking lock actuator.

FIG. 3 shows a second variation of a specified set-point pressure for controlling the parking lock actuator in the form of a piston-cylinder unit when the parking lock is to be released. If the selector lever is moved away from the selector lever position P to some other selector lever position R, N or D, then here too the solenoid valve 12 is energized by the control unit 16 and a pressure in accordance with the set-point pressure specification is supplied to the parking lock actuator 8.

In this case, however, the specified set-point pressure does not vary in a ramp-like manner, but rather, the set-point pressure is here increased in steps. First, the piston 10 is acted upon for a first specifiable time period $t_3$ by a first pressure value $p_{start}$, which is required in order to release the parking lock reliably when the motor vehicle is on level ground and is not loaded. This pressure value is substantially lower than a maximum pressure value $p_{max}$ and can for example be within a range between 3 and 5 bar. The time $t_3$ can for example be chosen such that the pressure in the cylinder 9 of the parking lock actuator 8 can build up in accordance with the set-point pressure specification. If the pressure built up in the cylinder 9 of the parking lock actuator 8 and acting on the piston 10 is not sufficient to pull the locking element 3 out from between the pawl 1 and the guide-plate 2, then in accordance with the set-point pressure specification the pressure in the cylinder 9 is increased in steps until the parking lock is released or until a maximum pressure value $p_{max}$ has been reached. The pressure values $p_2$, $p_n$ between the first pressure value $p_{start}$ and the maximum pressure value $p_{max}$ are in turn maintained for times $t_4$, $t_5$ in order to enable the parking lock to be released at these set-point pressures. The maximum pressure value $p_{max}$ is preferably chosen such that it is sufficient to release the parking lock when the motor vehicle is fully loaded and is located on an incline steeper than 15%. For example, the maximum pressure value $p_{max}$ can be within a range of 15 to 18 bar.

With a set-point pressure specification than increases in steps it is advantageous for the step intervals of the set-point pressure specification $p_{start}$-$p_2$, $p_2$-$p_n$ to be made small. The smaller the step intervals $p_{start}$-$p_2$, $p_2$-$p_n$ of the set-point pressure specification, the more accurately can the pressure required to release the parking lock, and hence too the force required to release the parking lock, be determined, so that the mass of the motor vehicle can also be determined more accurately.

INDEXES

1 Locking pawl
2 Guide-plate
3 Locking element
4 Connecting rod
5 Spring element
6 Stop
7 Parking plate
8 Parking lock actuator
9 Cylinder
10 Piston
11 Spring element
12 Control valve
13 Pressure medium supply line
14 Outflow line
15 Pressure medium sink
16 Control unit

The invention claimed is:

1. A method for provisional determination of a mass of a motor vehicle for a purpose of controlling a starting operation from when the motor vehicle is at rest, the method comprising:
   proceeding with the method when the motor vehicle is stationary and a parking lock of the motor vehicle is engaged, and the parking lock when engaged locking a transmission output shaft;
   obtaining inclination information of the motor vehicle or a road on which the motor vehicle is located, and the inclination information being obtained from at least one of a sensor device and a navigation device;
   determining a force required to release the engaged parking lock while the motor vehicle is at rest;
   determining the mass of the motor vehicle as a function of the inclination information about the motor vehicle or the road on which the motor vehicle is located, and as a function of the force required to release the engaged parking lock while the motor vehicle is at rest;
   determining a starting gear or shifting characteristics for the starting operation of the motor vehicle based on the determined mass of the vehicle, and
   starting the motor vehicle using the determined starting gear or the determined shifting characteristics.

2. The method according to claim 1, further comprising determining the mass of the motor vehicle at one of:
   after each release of the parking lock;
   after a fresh start of the motor vehicle when the parking lock is released;
   after the parking lock is released when a control unit is initialized; and
   when the parking lock is released after the motor vehicle has been stationary for longer than a specifiable time.

3. The method according to claim 1, further comprising, with a parking lock actuator in a form of a piston-cylinder unit having a piston which is acted upon by a pressure medium for releasing the parking lock, determining the force required to release the parking lock as a function of a pressure required to release the parking lock in relation to a piston area of the piston acted upon by the pressure.

4. The method according to claim 3, further comprising acting upon the piston of the piston-cylinder unit, forming the parking lock actuator with a specified set-point pressure which varies either in steps or in a ramp-like manner.

5. The method according to claim 1, further comprising, with the parking lock being an electric actuator through which an electric current flows in order to release the parking lock, determining the force required to release the parking lock as a function of an amount of the electric current.

6. The method according to claim 1, further comprising determining the inclination information of the motor vehicle or the road on which the motor vehicle is located by the sensor device which is in a form of either an inclination sensor arranged on the vehicle or an acceleration sensor arranged on the vehicle.

7. The method according to claim 1, further comprising determining the inclination information of the motor vehicle or the road on which the motor vehicle is located, by the navigation device.

8. A control unit of a motor vehicle, which is designed to carry out the method according to claim 1 for the provisional determination of the mass of the motor vehicle.

9. A non-transitory computer readable medium having a computer program product with program code means, which are stored on a computer-readable data carrier, for provisional determination of a mass of a motor vehicle for a purpose of controlling a starting operation of the vehicle from when the motor vehicle is at rest, the provisional determination including proceeding when the motor vehicle is stationary and a parking lock of the motor vehicle is engaged, obtaining inclination information of the motor vehicle or a road on which the motor vehicle is located from at least one of a sensor device and a navigation device, determining a force required to release the engaged parking lock, determining a mass of the motor vehicle as a function of inclination information about the motor vehicle or the road on which the motor vehicle is located, and as a function of the force required for releasing the parking lock engaged while the motor vehicle is at rest, determining a starting gear or shifting characteristics for the starting operation of the motor vehicle based on the determined mass of the vehicle, and starting the motor vehicle with the determined starting gear or the determined shifting characteristics, and the provisional determination being carried out when the computer program product is run on a control unit of the motor vehicle.

* * * * *